(12) United States Patent
Cotichini et al.

(10) Patent No.: US 8,639,675 B2
(45) Date of Patent: Jan. 28, 2014

(54) LINKING OF PARENT-CHILD DATA RECORDS IN A LEGACY SOFTWARE MODERNIZATION SYSTEM

(75) Inventors: Christian Cotichini, Vancouver (CA); Michael E. F. White, Vancouver (CA); David John Green, Surrey (CA)

(73) Assignee: Make Technologies, Inc., Vancouver, B.C. (CA)

( * ) Notice: Subject to any disclaimer, the term of this patent is extended or adjusted under 35 U.S.C. 154(b) by 693 days.

(21) Appl. No.: 12/200,617

(22) Filed: Aug. 28, 2008

(65) Prior Publication Data

US 2010/0057759 A1 Mar. 4, 2010

(51) Int. Cl.
*G06F 17/30* (2006.01)

(52) U.S. Cl.
USPC .......................................... 707/696

(58) Field of Classification Search
USPC ................................. 707/602, 696
See application file for complete search history.

(56) References Cited

U.S. PATENT DOCUMENTS

| | | | | |
|---|---|---|---|---|
| 4,965,800 A * | 10/1990 | Farnbach | .................... | 714/724 |
| 5,319,453 A * | 6/1994 | Copriviza et al. | ................. | 346/6 |
| 5,463,768 A * | 10/1995 | Cuddihy et al. | ................. | 714/37 |
| 5,706,494 A * | 1/1998 | Cochrane et al. | ..................... | 1/1 |
| 5,708,828 A * | 1/1998 | Coleman | ....................... | 715/205 |
| 5,761,510 A * | 6/1998 | Smith et al. | .................... | 717/124 |
| 5,787,442 A * | 7/1998 | Hacherl et al. | ....................... | 1/1 |
| 5,806,065 A * | 9/1998 | Lomet | ............................. | 707/610 |
| 5,809,293 A * | 9/1998 | Bridges et al. | ................. | 712/227 |
| 5,873,075 A * | 2/1999 | Cochrane et al. | ..................... | 1/1 |
| 6,018,627 A * | 1/2000 | Iyengar et al. | ................ | 717/103 |
| 6,081,798 A * | 6/2000 | Johnson et al. | .................. | 706/54 |
| 6,151,608 A * | 11/2000 | Abrams | ......................... | 707/679 |
| 6,334,158 B1 * | 12/2001 | Jennyc et al. | .................... | 719/328 |
| 6,367,068 B1 * | 4/2002 | Vaidyanathan et al. | ...... | 717/143 |
| 6,453,314 B1 * | 9/2002 | Chan et al. | ............................ | 1/1 |
| 6,505,200 B1 * | 1/2003 | Ims et al. | ...................... | 707/638 |
| 6,549,949 B1 * | 4/2003 | Bowman-Amuah | .......... | 709/236 |
| 6,587,857 B1 * | 7/2003 | Carothers et al. | .............. | 707/602 |
| 7,010,501 B1 * | 3/2006 | Roslak et al. | ..................... | 705/23 |
| 7,080,085 B1 * | 7/2006 | Choy et al. | ............................ | 1/1 |
| 7,185,317 B2 * | 2/2007 | Fish et al. | ...................... | 717/121 |
| 7,257,597 B1 * | 8/2007 | Pryce et al. | ............................ | 1/1 |
| 7,263,597 B2 * | 8/2007 | Everdell et al. | .................. | 712/11 |
| 7,386,578 B2 * | 6/2008 | Fuerst | ................... | 1/1 |
| 7,509,298 B2 * | 3/2009 | Chandra et al. | .................. | 706/52 |
| 7,548,898 B1 * | 6/2009 | Tarenskeen et al. | .................. | 1/1 |
| 7,620,665 B1 * | 11/2009 | George et al. | .......................... | 1/1 |
| 7,778,982 B2 * | 8/2010 | Baker | ........................... | 707/694 |
| 7,873,666 B2 * | 1/2011 | Sauermann | .................... | 707/793 |
| 7,949,640 B2 * | 5/2011 | Holenstein et al. | ............ | 707/690 |
| 7,996,413 B2 * | 8/2011 | Cotichini et al. | ............. | 707/756 |
| 8,150,896 B2 * | 4/2012 | Cotichini et al. | ............. | 707/810 |
| 2002/0010912 A1 * | 1/2002 | Kasvand et al. | ................... | 717/4 |
| 2002/0072927 A1 * | 6/2002 | Phelan et al. | ...................... | 705/1 |
| 2003/0074371 A1 * | 4/2003 | Park et al. | .................. | 707/103 R |
| 2005/0080803 A1 * | 4/2005 | Sauermann | .................... | 707/101 |
| 2009/0164491 A1 * | 6/2009 | Cotichini et al. | ............. | 707/101 |
| 2009/0164492 A1 * | 6/2009 | Cotichini et al. | ............. | 707/101 |
| 2009/0177301 A1 * | 7/2009 | Hayes | .............................. | 700/94 |
| 2009/0276449 A1 * | 11/2009 | Syed et al. | .................... | 707/101 |

* cited by examiner

*Primary Examiner* — Sheree Brown
(74) *Attorney, Agent, or Firm* — Winstead PC

(57) ABSTRACT

A system and method for linking parent and child data records during data migration is disclosed. One embodiment comprises sequentially receiving a plurality of data records from an arbitrary source of records without running a query on the source of records, generating a destination store of records that contains the plurality of data records, and locating any records in the destination store of records that has a dangling key. In this way, the embodiment may correct dangling keys to generate a destination store of records with referential integrity.

12 Claims, 5 Drawing Sheets

US 8,639,675 B2

LINKING OF PARENT-CHILD DATA RECORDS IN A LEGACY SOFTWARE MODERNIZATION SYSTEM

TECHNICAL FIELD

The present invention relates generally to business systems and software, and more particularly to legacy data system modernization.

BACKGROUND

One of the greatest infrastructure challenges in organizations today is the reliance on database systems created and maintained over a period of time much longer than their anticipated lifespan. Many of these systems were created with numerous limitations and restrictions due to technological restraints of the time period. Over time, technology has rapidly improved and many of these systems have become outdated and inefficient. As a result, many organizations are looking for a viable approach to modernize their legacy database systems.

Past attempts at legacy database modernization have generally included direct software updates and/or data conversions. A first approach to legacy database modernization involves creating a new data store and uploading an entire legacy database into the new store in a single modernization attempt. One problem with this approach is that undetected flaws in the modernization software may result in unacceptable amounts of lost and/or destroyed data.

Another approach to legacy database modernization involves performing a record by record conversion of legacy source data into a new data store format. Although the occurrence of lost and/or destroyed data may be reduced, this approach may be both time-consuming and cost-prohibitive. Furthermore, the ability to successfully modernize parent-child data records with today's data modernization systems is limited.

Current modernization systems simply migrate parent and child data records separately from a legacy database to a modern database without any constraint or link connecting them in the modern database. This may result in the obsolescence or destruction of a substantial amount of data critical to an individual. For example, a modernization system may migrate a person's parent record separate from a child health record. If the link is lost during modernization, then critical data is lost, thus diminishing the database's effectiveness. Thus, a user of current data modernization system may not be able to completely rely on the integrity of the modern database produced by such a system.

Additionally, previous approaches may have required referential integrity constraints between parent and child data records to be implemented manually and explicitly via a database specific language. Furthermore, previous approaches have not allowed for partial modernization of subsets of legacy data records that maintain some degree of referential integrity between parent and child legacy data records. In other words, previous approaches may have required that a modernization be an 'all or nothing" endeavor, and would fail completely if a single parent-child data record was not able to be implemented in the modern database system.

SUMMARY

A system and method for linking parent and child data records during data migration is disclosed. One embodiment comprises sequentially receiving a plurality of data records from an arbitrary source of records without running a query on the source of records, generating a destination store of records that contains the plurality of data records, and locating any records in the destination store of records that has a dangling key. In this way, the embodiment may correct dangling keys to generate a destination store of records with referential integrity. Other embodiments are described in the detailed description and the appended claims.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF DRAWINGS

This disclosure is illustrated by way of example and not by way of limitation in the figures of the accompanying drawings, in which the like references indicate similar elements and in which.

DETAILED DESCRIPTION

Figure 1:
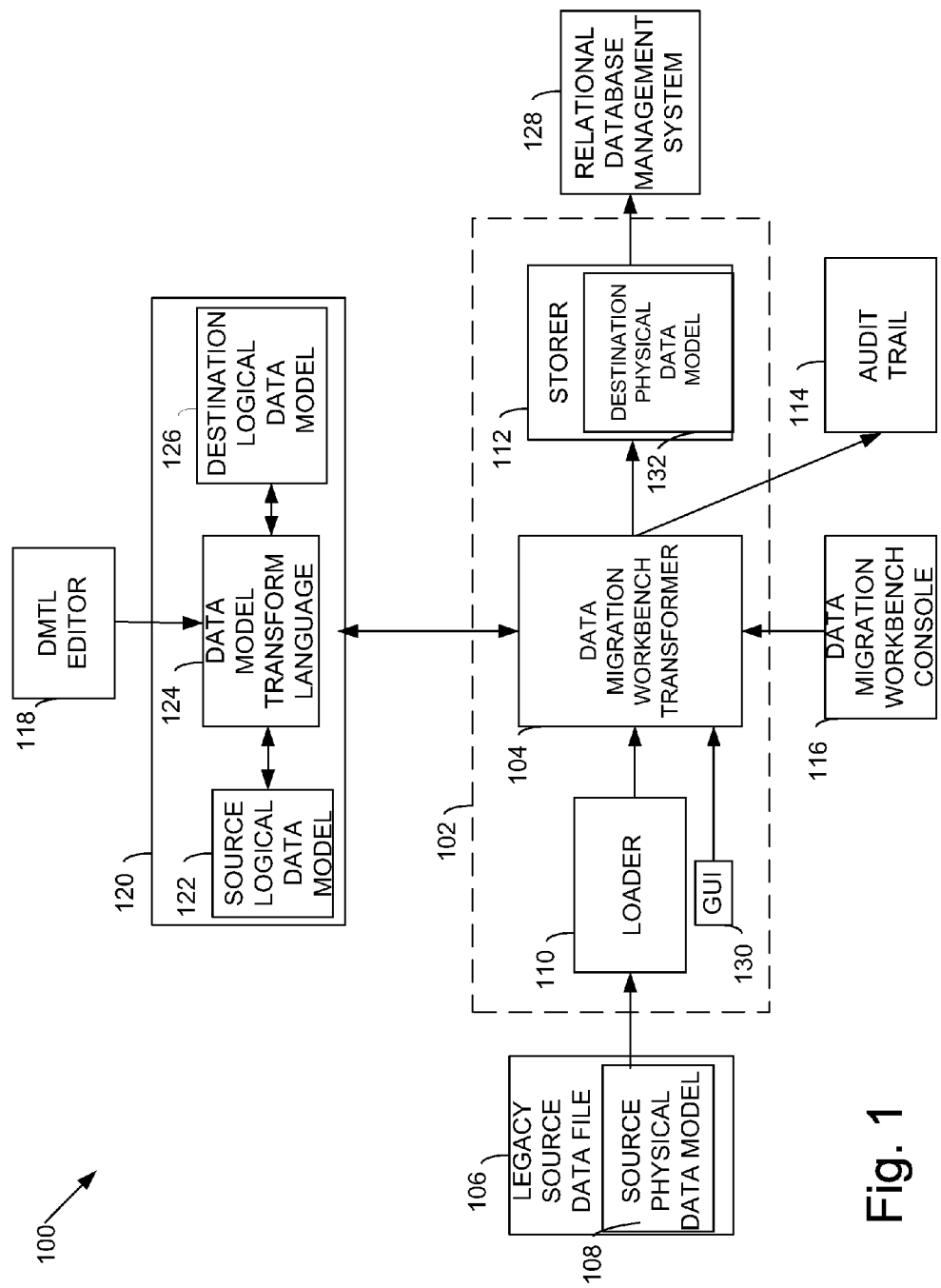
FIG. 1 is a schematic diagram of an exemplary embodiment of a data modernization system.

One exemplary embodiment of a data modernization system is schematically illustrated in FIG. 1. Data Modernization system 100 may include a legacy data source file 106 that encompasses a source physical data model 108 format. As a non-limiting example, legacy data source file 106 may be configured as a flat file export of a proprietary binary format. In some embodiments, source physical data model 108 may be configured as a lower-level representation of an implementation of the legacy source data file 106.

Data modernization system 100 may also include conversion engine 102. Conversion engine 102 may include loader 110, data migration workbench transformer (DMWT) 104, GUI 130, storer 112, and destination physical data model 132. Loader 110 may interface with legacy data source file 106 to parse the legacy data into an internal representation such as a document object model (DOM). In some embodiments, the legacy data may be a record that is parsed into an internal representation that conforms to a source logical data model 122 format. A logical data model provides semantic information more readily understood by a human user and therefore is not as implementation specific as the physical data model. Additionally, loader 110 may also validate source data 106 against source physical data model 108. Values that are not in conformance with the source physical data model may be deemed violations by DMWT 104 and subsequently logged as violations by audit trail 114. For example, dates might be stored in the source data as eight digit text strings such as YYYYMMDD. Thus, a non-eight digit string or a string that included a non-number symbol may be logged as one or more violations by audit trail 114. Audit trail 114 may be configured to log sets of distinct audit units created during a data modernization run. Each audit unit may contain a unique identifier that may be used to identify the source data record related to each audit unit. Storer 112 may be configured to translate data records received from DMWT 104 conforming to destination logical data model 126 and then pass them on to RDBMS 128. Like source physical data model 108, destination physical data model 132 may be configured as a low-level representation of the physical data layout of the target database (RDBMS 128).

Data modernization system 100 may also include logical data model interface 120, which may be configured as a module that represents the logical, abstracted referencing of the names used in legacy data source file 106 and a relational database management system 128. Logical data model interface 120 may in turn encompass source logical data model 122, destination logical data model 126, and data migration transform language (DMWTL) 124. DMWT 104 may access logical data model interface 120 to create a destination logical data model via DMWTL 124 that may be based in part on source logical data model 122. DMWTL 124 may utilize reference names included within source physical data model 108 and destination logical data model 126. Furthermore, DMWT 104 may read both the source and destination logical models and use them to validate legacy source data file 106. For example, entity and field names within data source 106 may be validated against both the source and destination logical models to ensure the accuracy of destination logical data model 126.

Data modernization system 100 may further include data model transform language (DMTL) editor 118 and data workbench migration console (DMWC) 116. DMWTL editor 118 may be a program accessed by a user via GUI 130 and logical data model interface 120 to update and modify a rule set (as described in further detail with regard to FIG. 2) embodied by DMWT 104 so as to improve the accuracy of the transform/migration process of DMWT 104. DWMC 116 may provide a user real-time data via DMWT 104 and GUI 130 to assess the efficiency and performance of the data conversion process through data conversion engine 102 (e.g. number of records modernized per second, total violations, memory used, etc.).

Each data record that is successfully uploaded by loader 110 from legacy source data file 106 may then be processed by DMWT 104. A rule set (as described in further detail with regard to FIG. 2) within DMWT 104 may be applied to each data element (datum) to ensure that each data datum passed to storer 112 is of the data object format defined by source physical data model 108 and also concurs with destination physical data model 132 and destination logical data model 126. Once encapsulated as an instantiated data object by storer 112, data objects may then be stored in various relational database management systems 128, such as an Oracle® database management system, as one example.

Figure 2:
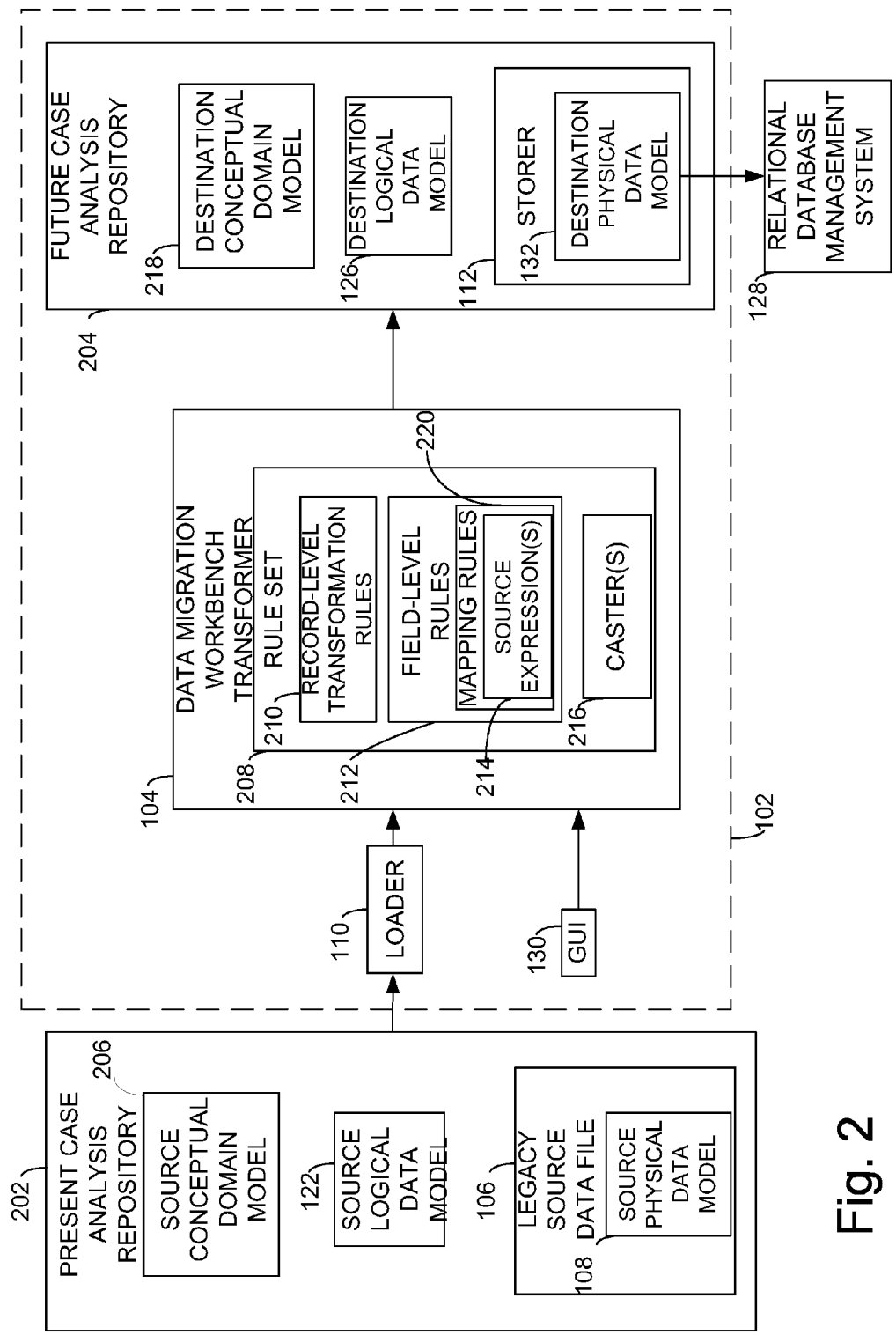
FIG. 2 is a schematic diagram of the data modernization system of FIG. 1 that depicts present case analysis and future case analysis repositories.

FIG. 2 is a schematic diagram of the data modernization system of FIG. 1 that depicts present case analysis and future case analysis repositories. Another representation of a data migration flow is depicted in FIG. 2. In this example, legacy source data may flow from present case analysis repository (PCAR) 202 through conversion engine 102 to RDBMS 128 via loader 110, DMWT 104, and future case analysis repository (FCAR) 204. PCAR 202 may include legacy source data file 106 which may be further defined by source physical data model 102. PCAR 202 may also include source logical data model 122 and source conceptual domain model 206 which may be mapped by a system programmer.

FCAR 204 may include destination conceptual domain model 216, destination logical data model 126, and storer 112 which may be further defined by destination physical data model 132. Destination conceptual domain model 218 and destination physical data model 132 may be mapped and defined by a system programmer. A relational database management system may access storer 112 within FCAR 204 to download data objects that have been stored within storer 112.

Each data element (datum) that is successfully uploaded by loader 110 from legacy source data file 106 may then be processed by DMWT 104. DMWT 104 may include a rule set 208. Rule set 208 may be applied to a legacy data object to transform the legacy data object into a modern data object. A legacy data object may be a field, a data record, an arbitrarily defined set of data records, an entire database, or other individually transformable data object. Rule set 208 may include record-level transformation rule(s) 210, field level rule(s) 212, source expression(s) 214, and caster(s) 216 which may all be applied to the data records that are processed by DMWT 104. For example, record-level transformation rules may include a rule that commands DMWT 104 to run all or a subset of the mapping rules in the transformer on the legacy source data. An example of a field-level rule may be a mapping rule 214 that copies a source logical field name within source logical data model 122 into a destination logical field name within destination logical data model 126. A mapping rule may further include a source expression 214. A source expression may be defined as a further refinement of a mapping rule. For example, in a license plate data record, the presence of certain letters may indicate specific automobile registration information such as a commercially-owned or government-owned vehicle. In this example, a "G" might be used at the end of a license plate number data entity to indicate that the vehicle is a government owned vehicle. A source expression 214 may determine the presence of the letter "G" at the end of a license plate number data datum and produce a Boolean value based on the presence of the letter (or lack thereof) that may be stored in storer 112.

Another example of DMWT 104 may utilize mapping rules 220, for example surrogate keys may be created and used within storer 112, each of which indirectly reference a natural key of a single data datum in legacy source data file 106. Furthermore, a mapping rule may create a foreign key that is a reference between two related data objects within storer 112. Another example of a DMWT mapping rule 220 may be a rule that establishes a unique key for the natural key of each data datum in legacy source data file 106. A unique key may require that each natural key of a data datum be a singular key unto itself. In other words, the creation of a unique key ensures that duplicate legacy source data file datums will not be passed on to storer 112 and duplicates may be recorded in audit trail 114 as violations.

Additionally, rule set 208 may include a caster 216, which may be a script or piece of compiled code that may validate and transform a single typed datum to an output field. For example, a default caster 216 may simply validate that the datum can represent a number (e.g. a caster of this type would be utilized when transforming a number in legacy data source file 106 to a number in storer 112). A more complex caster 216 may do project-specific work such as extract the "year" component from a complex binary field that was used to store sequence numbers for assigning numbers to, for example, birth and death certificates.

After the transforming and migration of a pre-determined number of source data records through DMWT 104 (by applying rule set 208 to each data record) is complete, a number of destination records may have been formed and passed on to storer 112. Consequently, RDBMS 128 may then be populated with data object records. Unique keys and surrogate keys are valid for all data object records at this point; however, some foreign keys generated by DMWT 104 from natural key relationships in legacy source data file 106 may be invalid. DMWT 104 may then perform a referential integrity validation between legacy source data file 106 and the target database stored within RDBMS 128 (as described in further detail with regard to FIG. 5).

Figure 3:
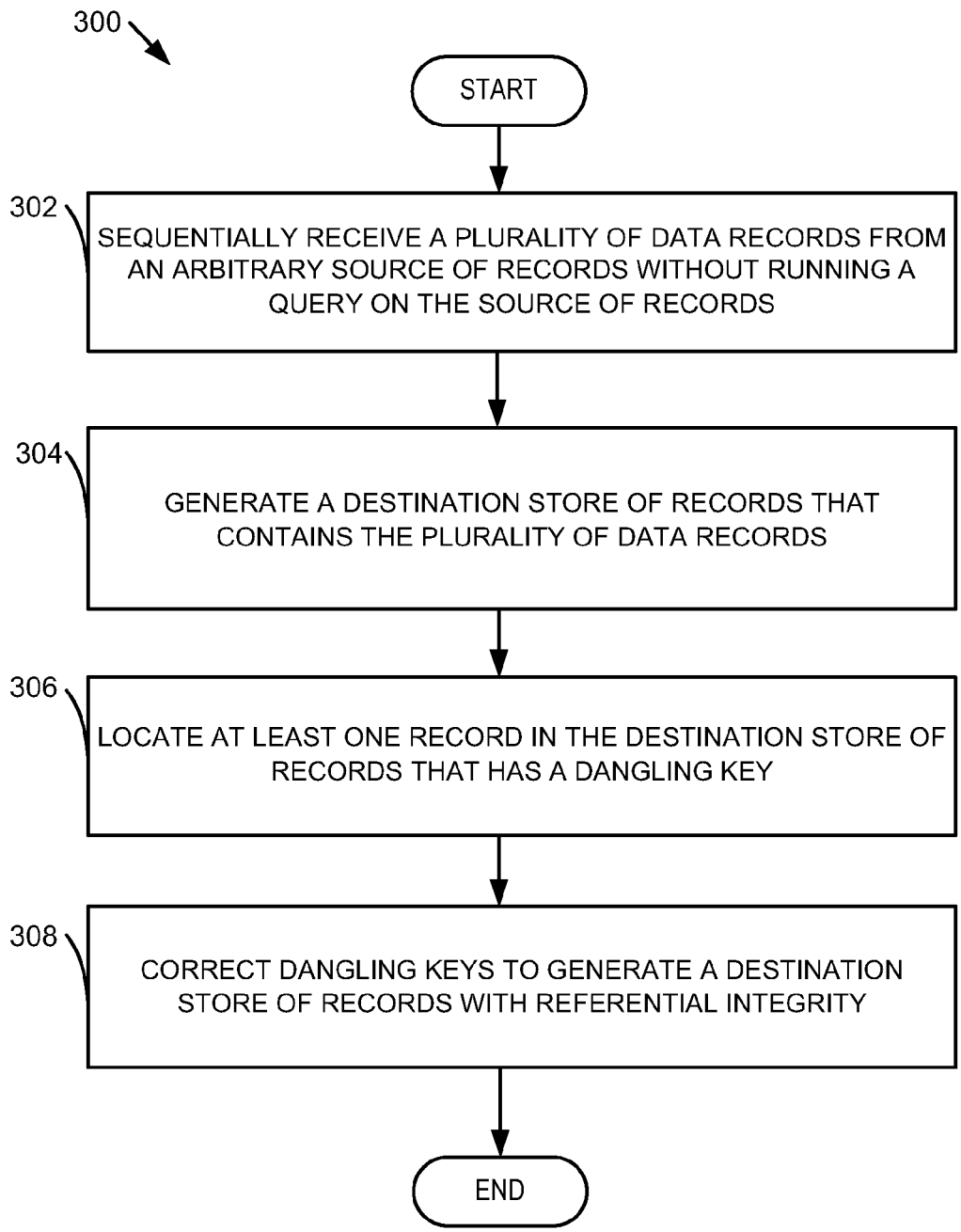
FIG. 3 illustrates a flow chart depicting an example routine for transforming/migrating parent and child source data records through the data modernization system of FIG. 1.

FIG. 3 illustrates a flow chart depicting an example method 300 for transforming/migrating parent and child source data records through the data modernization system of FIG. 1. First, as indicated in block 302, method 300 comprises sequentially receiving a plurality of data records from an arbitrary source of records without running a query on the source of records. In some embodiments a plurality of data records may be received in a batch and then sequentially processed within the principles of this disclosure. Examples of arbitrary sources of records include a database, a flat file, a network stream, or other suitable sources of data records that may have linked data between them.

Next, in block 304, method 300 comprises generating a destination store of records that contains the plurality of data records. Then, method 300 comprises locating at least one record in the destination store of records that has a dangling key, as shown in block 306. Then, in block 308, method 300 comprises correcting dangling keys to generate a destination store of records with referential integrity. For example, dangling keys may be corrected by deleting records with the dangling keys, by changing dangling keys in a record to create a valid foreign key, etc.

In some embodiments, method 300 may further comprise logging the records with dangling keys prior to correcting the dangling keys, in order to flag certain types of errors and a report may be generated to highlight errors in a data migration. In this way, any resolution of record relationships may be delayed until after a record is processed, which may reduce a computationally intensive data migration, and provides a migration that allows parent and child data records to be migrated independently in any sequence, in parallel, etc.

Figure 4:
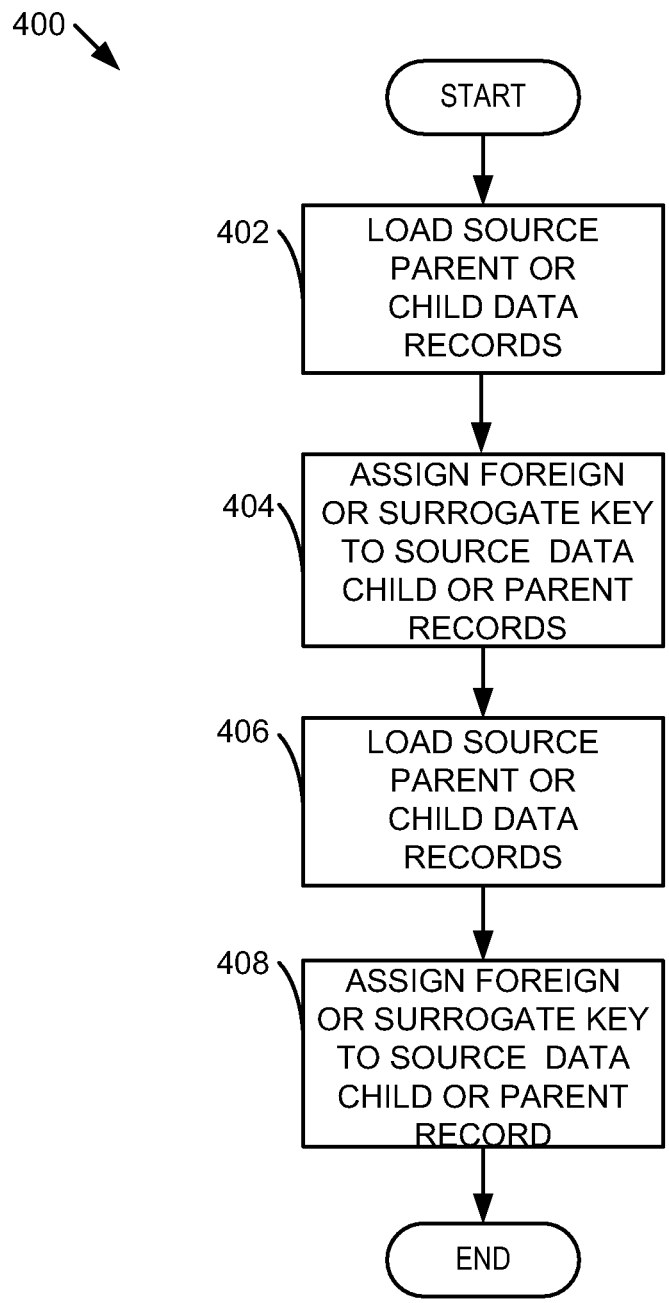
FIG. 4 illustrates a flow chart depicting an example routine for transforming/migrating parent and child source data records through the data modernization system of FIG. 1.

FIG. 4 shows a flow chart depicting an example routine for transforming/migrating parent and child source data records through the data modernization system of FIG. 1 when DMWT 104 encounters natural keys that are used in foreign key relationships that are the subject of modernization. At 402, a plurality of source data records may be uploaded by loader 110. The plurality of data records uploaded by loader 110 at 402 may either be a plurality of parent records or a plurality of child records. At 404, the plurality of data records uploaded by loader 110 may be transformed/migrated through DMWT 104 during which each record will be assigned a foreign key or a surrogate key if none already exists. At 406, a plurality of parent data records or a plurality of child data records may be uploaded by loader 110 depending on whether a plurality of parent data records or a plurality of child data records was uploaded at 402 (i.e. if a plurality of parent data records was uploaded at 402 then a plurality of child data records may be uploaded at 406 and vice-versa).

At 408, the plurality of data records uploaded by loader 110 at 406 may be transformed/migrated through DMWT 104 during which each record will be assigned a foreign key or a surrogate key. Thus, a plurality of parent data records (or child data records) may be uploaded and transformed/migrated through DMWT 104 prior to and separate from the corresponding plurality of child data records (or parent records) that will subsequently be transformed and migrated through DMWT 104. Correspondingly, when an individual parent data record is uploaded at 402 and assigned a surrogate key at 404, the respective child data record linked to the parent data record may be assigned a foreign key at 408. Similarly, when a plurality of child data records is uploaded at 402 and is assigned a surrogate key at 404, the respective parent data record linked to the child data record may be assigned a foreign key at 408.

Hence, both parent and child data records may be assigned either a surrogate key or a foreign key. For example, when a parent data record is assigned a foreign key, the foreign key will "point to" (reference) the surrogate key of the corresponding child data record after both data records have been transformed/migrated. Similarly, when a child data record is assigned a foreign key, the foreign key will "point to" (reference) the surrogate key of the corresponding parent data record after both data records have been transformed/migrated.

The ability to enforce foreign key constraints on the target database (RDBMS 128) ensures that the target database is populated only by complete parent-child data combinations that are linked by the constraint. This is a distinct advantage of the present disclosure as previous modernization systems simply migrated parent and child data records separately without any constraint or link connecting them in the modern database. Furthermore, the ability to enforce foreign key constraints after a predetermined number of legacy data records have been transformed/migrated allows the parent and child data records to be transformed/migrated in parallel. This may result in faster and more efficient transformation/migration times.

In contrast, previous approaches typically required a database programmer to laboriously migrate tables individually via custom-written sections of code, for example in the SQL programming language. Furthermore, previous approaches have not allowed for surrogate keys to be assigned to natural keys during a transformation/migration. If surrogate keys were utilized in previous approaches, typically they would be implemented incrementally in either the legacy source data file (prior to any transformation/migration) or in the target database (following a transformation/migration). Capturing violations could thus not be performed during a migration, but instead had to be performed prior to or following a transformation/migration. Hence, violating data records could only be removed manually from either the legacy data file or the target database.

Figure 5:
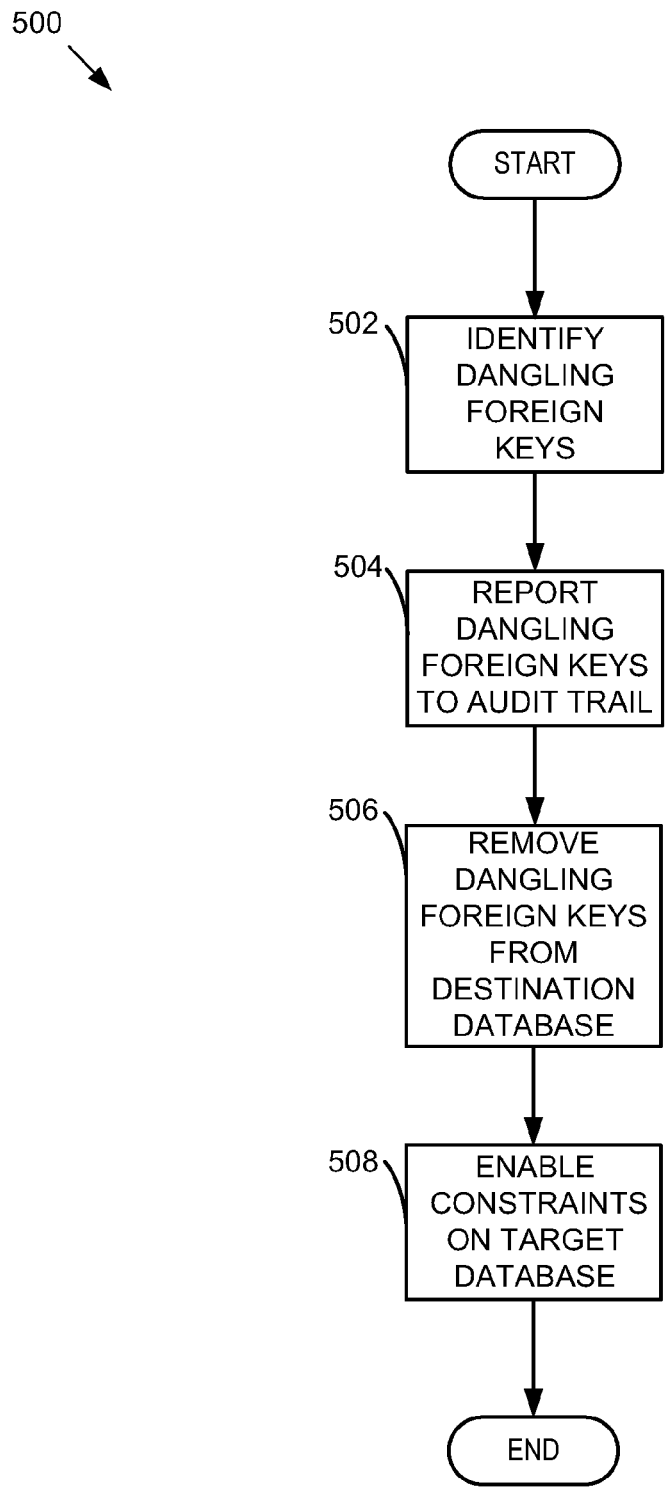
FIG. 5 illustrates a flow chart depicting an example routine for identifying and removing dangling foreign keys from a destination database within the modernization system of FIG. 1.

FIG. 5 shows a flow chart depicting an example routine for identifying and removing dangling foreign keys from a destination database within the modernization system of FIG. 1. Foreign key constraints may ensure that the foreign key each parent or child data record that was assigned a foreign key by DMWT 104 points to a surrogate key of an existing destination database parent or child data record. When a foreign key does not point to a surrogate key the foreign key is said to be "dangling". Dangling foreign keys may be identified by DMWT 104 at 502. At 504, dangling foreign keys may be reported as violation logs to audit trail 114. The foreign key violation log entries may include the unique key of the specific data datum, the present case analysis repository natural key value of the specific data datum, and the surrogate key of the destination data object record, as examples. Furthermore, natural key values may also be logged to audit trail 114 at 504 so that rule set 208 or logical destination data model 126 may be modified in by a system user in response thereto.

At 506, foreign key violations may be corrected by DMWT 104. There are generally two methods used to correct foreign key violations: record culling and foreign key overwriting. Record culling may include removing data records from modern RDBMS 128 that are associated with dangling foreign keys. This process may be iterative as the removal of data records may produce additional dangling foreign keys. Foreign key overwriting may entail overwriting with null the foreign key field in the modern record that is associated with a dangling foreign key. With foreign key overwriting, the data datum may still exist in the modern RDBMS, but is not linked to the destination record.

After transforming and migrating a predetermined number of source data records through DMWT 104 (by applying rule set 208 to each data object), and dangling foreign keys are removed at 506, foreign key constraints may be enabled on the destination database at 508.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method comprising:
   at a conversion engine executed on a computing device:
      sequentially loading a plurality of legacy data records from a legacy source data file stored in an arbitrary source without running a query on the arbitrary source, the plurality of legacy data records including parent records and child records;
      concurrently migrating the parent records and corresponding child records while loading additional legacy data records, wherein the parent records and corresponding child records are migrated, independently and in parallel, through a data migration workbench transformer of the conversion engine, such that during the loading of the plurality of data records:
         one or more of the parent data records are uploaded and assigned corresponding surrogate keys, and the respective child data records linked to each of the one or more parent data records are assigned corresponding foreign keys, and such that one or more other child data records are uploaded and assigned corresponding surrogate keys, and the respective parent data records linked to the other child data records are assigned corresponding foreign keys;
      generating a destination store of records that contains the migrated parent records and child records;
      locating at least one record in the destination store of records that has a dangling key;
      correcting dangling keys to generate a destination store of records with referential integrity, wherein correcting dangling keys includes at least one of deleting the record with the dangling key or changing the dangling key in the record to create a valid foreign key, where the destination store of records is configured as a low-level representation of a physical data layout of a target database.

2. The method of claim 1, further comprising logging the records with dangling keys prior to correcting the dangling keys.

3. The method of claim 2, further comprising generating a report containing the logged records.

4. The method of claim 1, wherein the arbitrary source is a database.

5. The method of claim 1, wherein the arbitrary source is a flat file.

6. The method of claim 1, wherein the arbitrary source is a network stream.

7. A non-transitory computer-readable medium comprising computer-executable instructions being executable by a modernization system to:
   at a conversion engine executed on a computing device:
      sequentially load a plurality of legacy data records from a legacy source data file stored in an arbitrary source without running a query on the arbitrary source, the plurality of legacy data records including parent records and child records;
      concurrently migrate the parent records and corresponding child records while loading additional legacy data records, wherein the parent records and corresponding child records are migrated, independently and in parallel, through a data migration workbench transformer of the conversion engine, such that during the loading of the plurality of records:
         one or more of the parent data records are uploaded and assigned corresponding surrogate keys, and the respective child data records linked to each of the one or more parent data records are assigned corresponding foreign keys, and such that one or more other child data records are uploaded and assigned corresponding surrogate keys, and the respective parent data records linked to the other child data records are assigned corresponding foreign keys;
      generate a destination store of records that contains the migrated parent records and child records;
      locate at least one record in the destination store of records that has a dangling key; and
      correct dangling keys to generate a destination store of records with referential integrity, wherein correcting dangling keys includes at least one of deleting the record with the dangling key or changing the dangling key in the record to create a valid foreign key, where the destination store of records is configured as a low-level representation of a physical data layout of a target database.

8. The non-transitory computer-readable medium of claim 7, further comprising instructions executable to log the records with dangling keys prior to correcting the dangling keys.

9. The non-transitory computer-readable medium of claim 8, further comprising instructions executable to generate a report containing the logged records.

10. The non-transitory computer-readable medium of claim 7, wherein the arbitrary source is a database.

11. The non-transitory computer-readable medium of claim 7, wherein the arbitrary source is a flat file.

12. The non-transitory computer-readable medium of claim 7, wherein the arbitrary source is a network stream.

* * * * *